J. W. BRENKERT.
WATER PURIFYING APPARATUS.
APPLICATION FILED MAR. 22, 1916.
1,309,876.
Patented July 15, 1919.
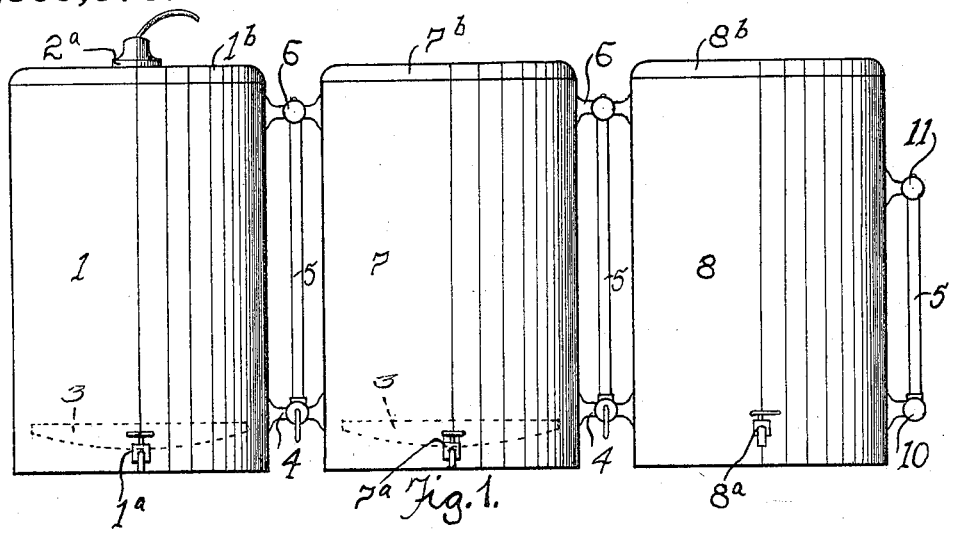
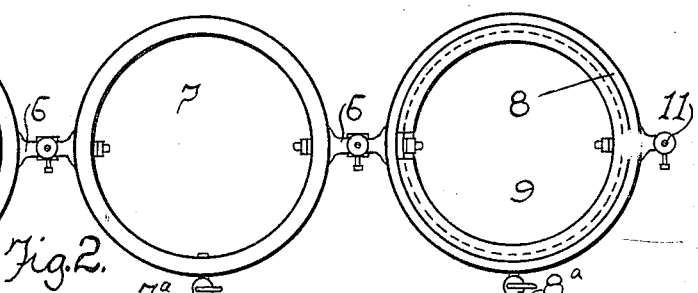
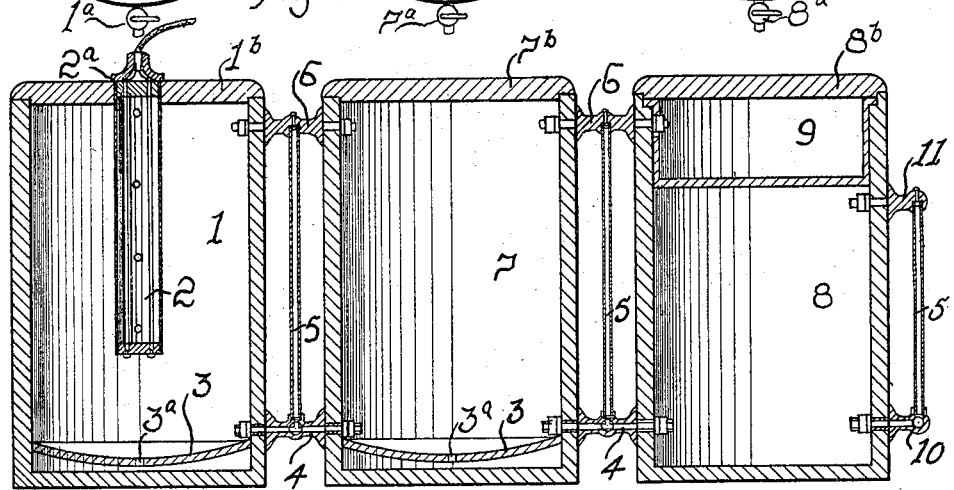
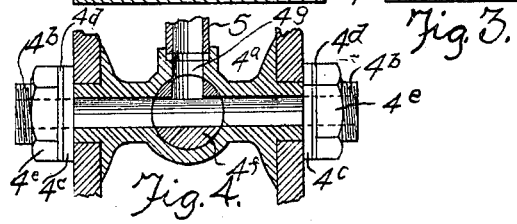
Inventor
Joseph W. Brenkert,
By A. B. Bowman
Attorney

UNITED STATES PATENT OFFICE.

JOSEPH W. BRENKERT, OF SAN DIEGO, CALIFORNIA.

WATER-PURIFYING APPARATUS.

1,309,876.     Specification of Letters Patent.     Patented July 15, 1919.

Application filed March 22, 1916. Serial No. 85,843.

*To all whom it may concern:*

Be it known that I, JOSEPH W. BRENKERT, a citizen of the United States, residing at San Diego, in the county of San Diego and State of California, have invented certain new and useful Improvements in Water-Purifying Apparatus, of which the following is a specification.

My invention relates to a water purifying apparatus, and the objects of my invention are: First, to provide an apparatus of this class consisting of an electropurifier vessel, a settling vessel and a supply vessel. Connected together by means of water conductors which may be readily opened and closed as desired; second, to provide a removable partition in the bottom of the vessel so shaped as to readily remove the dirt and silt that settles therein; third, to provide a new and novel conduit and valve means in combination with means for determining the quantity of water in each of said vessels; fourth, to provide a water purifying apparatus of this class which is simple and economical of construction, durable, easy to operate and very efficient in its action.

With these and other objects in view as will appear hereinafter my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a side elevational view of my apparatus complete. Fig. 2 is a top view of the same with the covers and electropurifier removed. Fig. 3 is a longitudinal sectional view, and Fig. 4 is a detailed fragmentary sectional view of the conduit, valve mechanism and water gage combined.

The electropurifier vessel 1, electropurifier 2, removable partition 3, water conduit and valve 4, water gage 5, support 6, secondary settling vessel 7, supply vessel 8, ice vessel 9, support and conductor 10 and support 11 constitute the principal parts of my apparatus.

The electropurifier vessel 1 is preferably a circular earthenware vessel which is provided with a dish-shaped readily removable partition 3 in its bottom end which is provided with a central hole adapted to allow the dirt and water passage therethrough. This vessel is also provided with a faucet $1^a$ through its side wall beneath the outer edge of said dish-shaped partition so that when the faucet is open the sediment from the water will go down through the hole $3^a$ from the surface of the partition 3 and out through the faucet $2^a$. Mounted on the top of this vessel is a cover $1^b$ which is provided with a central hole adapted to permit the electropurifier 2 to be inserted therein and said electropurifier rests on the projection $2^a$ around the outer edge of the insulated head of said electropurifier. The electropurifier is of the ordinary or conventional type consisting of two electrodes spaced apart from each other and provided with an electrical conductor with terminals connecting with each of said electrodes which extend to any source of electrical energy. It will be here noted, however, that different shapes and forms of electropurifiers may be used and supported by this lid $1^b$, the electropurifier being no part of this present invention. Mounted adjacent this vessel is a similar vessel 7 and they are connected together by means of the conducting piece 4 near the bottom of said vessels and by means of the support 6 near the top of said vessels. This conducting piece 4 is a tubular shaped metallic piece provided with flanges $4^a$ adapted to fit against the outer surface of the vessels and the ends $4^b$ extend inwardly through the walls of said vessels and are externally threaded. Mounted over these ends $4^b$ are gaskets $4^c$ adapted to fit against the inner surface of the walls of the vessel for making a water-tight fit. Mounted against these gaskets are washers $4^d$ and against the washers and screwed onto the end is the nuts $4^e$ thus forming a tight fit between the conduits 4 and the walls of the two adjacent vessels. Mounted centrally in this conduit 4 is a tapered revoluble plug $4^f$ which is provided with a three-way passage way therein, thus forming a three-way valve which conforms to the inner surface of the tubular piece 4. Communicating centrally with the top side and with one of the passage ways in the plug $4^f$ is an annular recess $4^g$ in the upper end of which is mounted a gasket and on the top of the gasket the water gage 5 so that when the plug $4^f$ is turned in the position shown in Fig. 4 of the drawings water will pass from the vessel 1 to 7 and will also seek the highest level in the glass water gage 5. After said plug is turned to the left, the passage between the two vessels will be closed between the gage 5 and the vessel to the left will communicate so that the gage will indicate the quantity of water in the vessel to the left at all times which is to be the fullest vessel. The support 6 is constructed similarly to the tube 4 except that it is not provided with a valve nor passage way but is provided with a similar recess for the connection of the gage 5, and it is provided with a screw mounted in the upper side, adapted to screw down against a washer and gasket for making the gage water tight at both ends. The settling vessel 7 is provided with a removable partition 3 as hereinbefore described and with a faucet $7^a$ adapted to remove the sediment from the bottom of said vessel and it is provided with a cover $7^b$ and the vessel 8 is similarly constructed to that of 7 and between the vessels 7 and 8 are provided the same kind of conducting pieces, water gages and supports as between the vessels 1 and 7. This vessel 8 is provided with a sub-vessel 9 which is adapted for ice and is supported in the upper end of said vessel. The vessel 8 is provided with a faucet $8^a$ for the water supply and with a cover $8^b$. The water gage on this supply vessel, however, is supported by supports 10 and 11 which are constructed the same as one end of the supports 6 including the enlarged central portion and the lower one has a hole therein for connecting the lower end of the water gage with the inner side of the vessel 8.

Though I have shown and described a particular construction, combination and arrangement of parts, I do not wish to be limited to this particular construction, combination and arrangement but desire to include in the purview of my invention the construction, combination and arrangement substantially as set forth in the appended claims.

It is obvious that with this construction there is provided a water purifying apparatus which consists of a series of vessels placed side by side with means for conducting water from one vessel to the other which are provided with means for closing and opening as desired, that one of said vessels supports an electropurifier and is provided with a removable partition adapted to separate the sediment and readily cleanse the bottom of the vessel of the sediment, that the means for conducting the water between the vessels comprise a combined conductor, three-way valve and water gage, that the supply vessel comprises a water and ice box or cooler in connection therewith, that the apparatus as a whole is simple and economical of construction, durable, easy of operation and very efficient in its action.

Having thus described my invention what I claim as new and desire to secure by Letters Patent, is:

1. In an apparatus of the class described, the combination of an electropurifying vessel, a dish shaped partition loosely mounted in the bottom thereof provided with a hole in the center, a drain faucet secured in the wall of said electropurifying vessel and communicating with the interior thereof below the outer edge of said partition, whereby the sediment from said vessel may be readily removed, another vessel adjacent thereto, conducting means between said vessels provided with means for making them non-communicating and with a gage in connection therewith.

2. In an apparatus of the class described, an electropurifying vessel, a dish shaped partition loosely mounted in the bottom thereof provided with a hole in the center and a faucet below said partition through the outer wall of said vessel, another vessel adjacent thereto provided with a dish shaped partition loosely mounted in the bottom thereof provided with a hole in the center and a faucet below said partition through the outer wall of said vessel, means for conducting water from one vessel to the other, means for opening and closing said conducting means and a glass gage in connection therewith.

3. In an apparatus of the class described, an electropurifying vessel, a dish shaped partition loosely mounted in the bottom thereof provided with a hole in the center and a faucet below said partition through the outer wall of said vessel, another vessel adjacent thereto provided with a dish shaped partition loosely mounted in the bottom thereof provided with a hole in the center and a faucet below said partition through the outer wall of said vessel, means for conducting water from one vessel to the other, means for opening and closing said conducting means, a glass gage in connection therewith, and another vessel adjacent said second mentioned vessel provided with means for conducting water between said vessels, means for opening and closing said conducting means, and a glass gage in connection with said opening and closing means.

In testimony whereof I have hereunto set my hand at San Diego, California, this 15th day of March, 1916.

JOSEPH W. BRENKERT.

Copies of this patent may be obtained for five cents each, by addressing the "Commissioner of Patents, Washington, D. C."